United States Patent Office 3,761,370
Patented Sept. 25, 1973

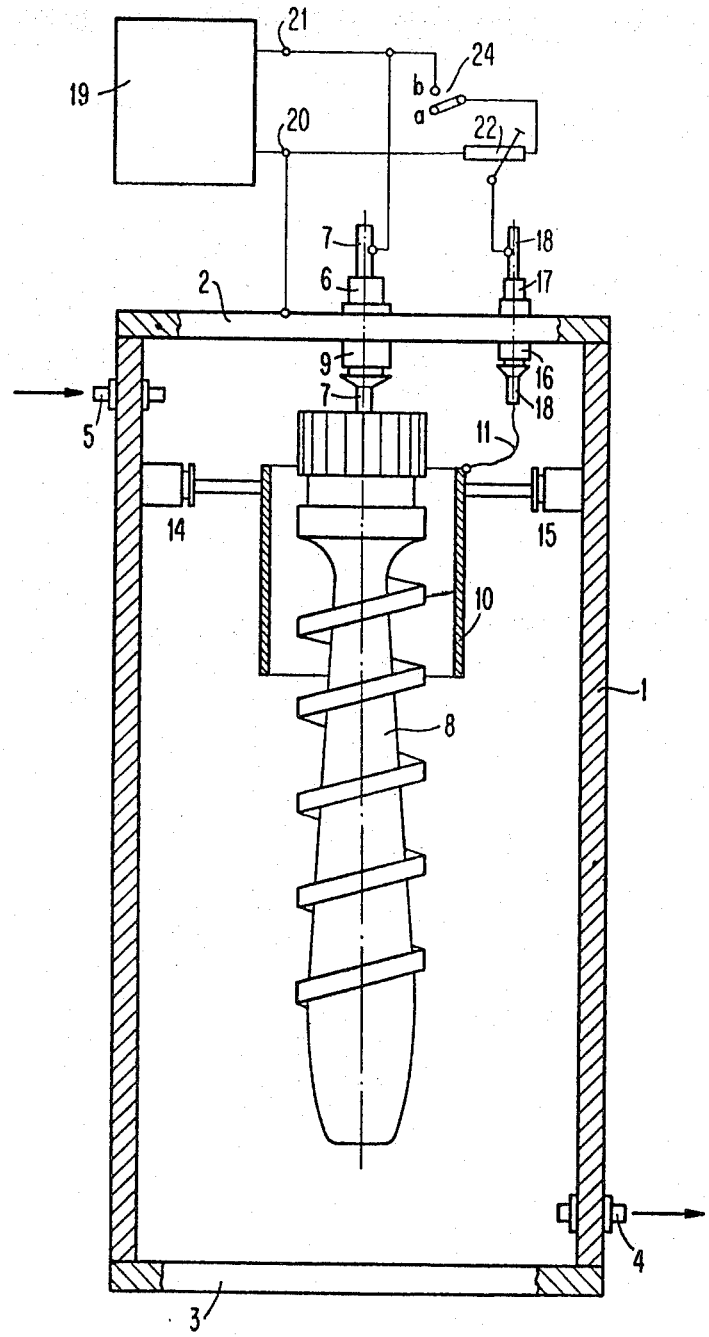

3,761,370
METHOD OF HARDENING THE SURFACE OF
WORKPIECES MADE OF IRON AND STEEL
Klaus Keller, 4 Paulstrasse, 5039 Cologne-Weiss, Germany
Filed Sept. 20, 1971, Ser. No. 181,873
Claims priority, application Switzerland, Sept. 21, 1970,
13,938/70
Int. Cl. B01k 1/00; C23c 11/16
U.S. Cl. 204—164                               2 Claims

ABSTRACT OF THE DISCLOSURE

A method of selectively ionitriding a metal workpiece comprising establishing an electrical potential of one value between the workpiece and the treatment chamber and also establishing an electrical potential of a lesser value between a selected portion of the workpiece and an intermediate electrode member.

---

The present invention relates to a method of hardening the surface of workpieces made of iron and steel using an electrical glow discharge in a gas atmosphere containing diffusible substances at an elevated temperature. Such methods are preferably known generally as applications of a gas atmosphere containing nitrogen for hardening by nitriding, the so-called ionitriding process, and are to a large extent employed industrially. But surface hardening by other diffusible substances according to this method is known as well, by way of example by the application of a gas atmosphere which contains a titanium compound.

In the surface hardening of workpieces according to the diffusion process value is generally attached to even penetration depth of the diffusible elements on all sides so that the same mechanical properties are obtained in all surface areas. However, there are cases where the workpiece has various areas subjected to different stresses which would make desirable varying diffusion treatment of individual surface zones. This problem will now be explained in greater detail for the example of worm conveyors of screw extruders and their hardening by nitriding, but the same problem also arises with other workpieces and their surface hardening.

In screw extruders for the plastics industry for the processing, by way of example, of glass-fibre and mineral-powder reinforced plastics, the worms are subject to pronounced wear. In order to reduce wear to the extent possible, a variety of hardening methods have been applied, nitriding of worms made e.g. of nitriding and chromium steels proving to be the most adequate.

As shown by statistical investigations and tests the worm is subject to the greatest wear at its front end and, respectively, directly at the back-flow baffle commonly there arranged.

Apart from the wear of the front worm end, the rear portion of the worm, that is on the driven end, is particularly subjected to torsional forces. This is due on the one hand to the fact that all frictional and shearing forces operative throughout the worm must be transmitted. On the other hand, increased torsional stresses occur because the core cross-section of the worm is strongly reduced at this point in the best interests of increased conveyor cross-section. Owing to the low torsional stiffness the greatest twist is here encountered in the filling area. Since the shearing stresses increase to the third power of the diameter reduction in addition, the said stresses are often higher by a multiple in this cross-section than in the other worm cross-sections. The maximum shearing stresses occur only on the surface so that the configuration of the surface, its elastic limit and ductility assume great significance. While nitriding enables greater shearing stresses and thus greater torsional moments to be transmitted in the elastic zones owing to the increase in the elastic limit, there exists an increased danger in the presence of excessive loads since the gas or bath-nitrided surfaces produced according to the conventional method admit of no plastic deformation. This then results in a preferred formation of spiral cracks between the webs and of coaxial cracks on the webs. This formation of cracks occurs the more often the stronger the grain boundary nitrid and, respectively, the preferred surface-parallel nitride line formation along former austenite grain boundaries is and the more the surface is hardened. It is further promoted by an excessively steep hardness gradient and by a mixed-phase structure in the boundary zone. As experience has revealed, the spiral cracks extend reticularly in the direction of the back-flow baffle and owing to the splitting off of entire hardened zone areas result in the premature destruction of the worm.

Since extreme wear resistance with great hardness as appears to be indicated at the front end of the worm would not be favourable for the entire worm for the reasons indicated, only a compromise in favour of minimum ductility in the individual cross-section can be aimed at.

A subtsantial improvement of the life of the worm would be achieved by providing, in the area of the greatest wear, the most wear-resistant surfaces and, in the area of the greatest torsion, the most ductile hard zones possible. These requirements could be met in nitrided worms by ensuring that the nitrogen supply is smaller in the area of torsion, that the grain boundary nitriding and the preferably surface-parallel nitride line formations along former austenite grain boundaries are suppressed and the intermetallic connecting zone is made comparatively thin and monophase. In the area of wear, however, the nitrogen supply should be large and a monophase connecting zone of which the thickness can be selected with an adequate wear reserve and corrision resistance as well as with an influenceable diffusion zone be produced in which the grain boundary nitriding and, respectively, nitride line design along former austenite boundaries is deliberately admitted or suppressed depending on the type of stress.

With the known methods of gas and bath-nitriding these requirements cannot be met. Nor is the known ionitriding of surfaces of workpieces made of iron and steel by means of an electrical glow discharge in a gas atmosphere containing nitrogen readily applicable to this end.

According to a proposal of the applicant not forming part of the present art the problem can be solved by effecting ionitriding in two or more successive spaces of time and that only individual surface areas of the workpiece are treated therein.

The present invention presents another solution of the problem described and relates to a method of hardening the surfaces of workpieces made of iron and steel by means of an electrical glow discharge in a gas atmosphere containing diffusible substances at an elevated temperature. The method according to this invention is characterized by the fact that different quantities of the substances from the gas atmosphere are diffused into at least two surface areas of the same workpiece thus producing diffusion zones having different mechanical properties in that, during treatment, the energy of the ion bombardments of at least one of the surface zones is altered at least temporarily in comparison with the energy of the ion bombardment of other zones.

The invention further relates to an apparatus for the performance of the said method in application of a container made of metal in which the workpiece to be treated is insulatedly arranged and connected, via an insulated current lead-in, to the at least temporarily negative pole of a current source of which the positive pole is connected to the container, characterized by an additional metallic electrode located between the workpiece and the container wall which is insulated relative to the container, connected, via an insulated current lead-in, with a voltage regulator located outside the container and which shields such surface portions of the workpiece which are to be treated by an ion bombardment of different energy.

A number of embodiments of this invention are described in greater detail with reference to the enclosed diagrammatic drawing.

A metallic container 1 preferably made of iron is shown in a diagrammatic longitudinal section in this drawing. The said container is closed by a metallic cover 2 and a metallic base plate 3. Connected to a suction tube 4 communicating with the interior of the container is a pumping unit (not shown) which maintains a predetermined underpressure, by way of example less than 10 mm. Hg, while the gas mixture desirable for the treatment contemplated, here by way of example ammonia gas, is supplied into the container. Arranged in the cover 2 as a lead-in is a metal rod 7 enclosed by the insulating sheath 6 and insulated relative to the cover 2, the said rod 7 carrying the workpiece 8 which is here a worm made of nitriding steel. The portion of the insulating sheath 6 extending into the container is provided, in the known manner, with a metallic shield 9 which is connected to the cover 2 on the one hand and, on the other, forms a protective gap together with the rod 7 in the known manner, the said gap preventing the penetration of the glow discharge towards the insulation 6. This current lead-in 6, 7 and 8 is naturally fitted to the cover so as to be gas-tight.

Arranged within the container 1 is an additional metallic electrode 10 which shields the portion of the worm 8 located at the driven end from the container wall and which here possesses, by way of example, cylindrical shape and extends over about one-third of the overall length coaxially with the worm 8. This additional electrode is insulated on all sides relative to the container wall and rests on the inner wall of the container 1 via insulated supporting members 14, 15. Such supporting members are known (Pat. No. 3,207,941) so that a more detailed description can be dispensed with. At all events the electrode 10 must be electrically insulated on all sides relative to both the container 1 and the workpiece 8.

For the purpose of producing and maintaining a glow discharge in the container 1, a current source 19 is provided which may, by way of example, supply a direct voltage gradually or continuously adjustable between 400 and 1500 volts which should supply a power of about 50 kw. for the treatment of workpieces with a surface of up to 5000 cm.³. The positive pole 20 of this current source 19 is commonly connected to the container, here to cover 2, while the negative pole 21 is connected, via the metal rod 7, to the worm 8 which in the present case thus permanently forms the cathode of the glow discharge obtained. In the present embodiment a potentiometer 22 is provided of which the tap is connected to the metal rod 18 while one end is connected to the positive pole 20 and the other end to the switch 24 with the two positions $a$ and $b$. In the position $a$ of the switch 24 the additional electrode 10 is connected, via the adjustable resistance of the potentiometer 22, to the container 1. In the position $b$ of the switch 24, however, the electrode 10 is supplied, via the tap of the potentiometer 22, with an adjustably lower potential than the container 1 connected to the positive pole 20 of the current source 19. In the left-hand extreme position of the potentiometer 22 the electrode 10 is connected to the positive pole 20 of the current source 19 and thus possesses the same potential as the container 1.

The apparatus according to the embodiment described enables the worm 8 in the nitrogen-containing atmosphere within the container 1 to be treated according to this method with an energy of the ion bombardment at the surface zones of the worm 8 shielded by the additional electrode 10, the said energy being reduced relative to the energy of the ion bombardment at the other surface zones. The surface hardening by ionitriding in which the workpiece involved is treated by means of an electrical glow discharge in a nitrogen-containing gas atmosphere at a temperature within the range of 500° C. is generally known, by way of example from the patent specifications Nos. 3,018,409, 3,004,133, 2,927,231, so that a more detailed description may be dispensed with. Mention is made of the fact, however, that the surfaces of the workpiece to be nitrided are subjected to ion bombardment and that nitrogen is diffused into these surfaces in the process. The nitrogen supply at the surface depends on the energy of the ion bombardment. According to the present method a different quantity of nitrogen is diffused into individual surface zones from the gas atmosphere so that diffusion zones of different mechanical properties are obtained. The adjustment of the energy of the ion bombardment is obtained by the more or less reduced strength of the electrical field at the surface zones within the additional electrode 10.

By way of example, if the switch 24 is in its position $a$, the additional electrode 10 assumes a potential relative to the worm 8 which is due to the plasma in the container 1 and depends on the magnitude of the resistance fixed at the potentiometer 22. If this resistance is very great in the right-hand extreme position of the potentiometer 22, by way of example 1000K ohms, the potential between the worm 8 and the electrode 10 is much lower than that between the surface zones of the worm 8, which are not shielded by the electrode 10, and the container 1. If the resistance is reduced at the potentiometer 22 by means of the tap, the potential at the electrode 10 rises; in the left-hand extreme position of the tap there no longer exists any potential reduction; owing to the small distance between the worm 8 and the shield, the energy of the ion bombardment of the zone involved may even be intensified relative to that operative on the other zones of the worm 8. If it is desired to run the electrode 10 at a certain operating voltage relative to the worm 8, the switch 24 is placed into position $b$; by means of the tap of the potentiometer 22 the desired operating voltage may then be fixed.

The results obtainable with the present method will now be described with reference to an appropriately treated worm with an overall length of 150 cm. and an outside diameter of the threads of 6 cm. The smallest diameter of the core at the driven end (filling area) was 3.5 cm.; the diameter at the end of the worm, about 5 cm. The worm made of a nitriding steel was ionitrided in an apparatus similar to that described, the concentrically arranged additional electrode 10 having had an inside diameter of 20 cm. and extending, from the driven end of the worm, over about 60 cm. length. Ionitriding was effected during 24 hours at a temperature of 510° C. The energy of the ion bombardment within the additional electrode 10 was reduced by a resistance of about 100K ohms in its connecting lead to the container. Upon completion of the treatment the worm was examined with respect to the mechanical properties of its surface zones in the area of the greatest torsional stress (filling area) and greatest frictional stress (front end) and the following results were obtained:

|  | Torsional range | Frictional range |
|---|---|---|
| Surface hardness, $HV_1$ in kg./mm.² | 730 | 960 |
| Nitriding depth | 0.26 | 0.34 |

It can be seen that other mechanical properties were obtained by the present method in the differentially treated surface zones by means of the different nitrogen supply and the effect of the shield. Owing to the locally differing ion bombardment and a thermal radiation, modified by the shield, from the workpiece to be treated, the depth of penetration and the hardness gradient in the surface is so controlled that the hardness gradient is as flat as possible in the torsional range. These mechanical properties are adjusted to the stresses operative on the involved portions of the worm in operation, but the transition between the two surface zones is gradual. Such worms have proved to have a longer life as compared with the same worms which had been uniformly treated. All structures above indicated as desirable for the nitrided surface can be obtained. The method above described for the surface hardening by ionitriding is not limited hereto but may also be applied to other types of surface hardening by an ion bombardment in a gas atmosphere containing diffusible substances, such as an atmosphere containing carbon, hydrogen, boron, oxygen etc. It is also possible to keep more than two surface zones virtually free from substances diffused into them by substantially complete suppression of the ion bombardment. Again, the apparatus described should be regarded only as an embodiment. In the ionitriding process here described as applied to a worm, the latter could also be suspended at its front end and the additional electrode insulatedly arranged on the base plate of the container. It is also possible to treat more than one workpiece in a container simultaneously. The electrical glow discharge can be operated not only with a direct voltage source; it is also possible to employ an alternating voltage or a half-wave voltage in which cases impedances or regulating transformers may be used as voltage regulators for the additional electrode. For many applications it may also be desirable to operate the additional electrode 10 at a potential relative to the workpiece 8 higher than the potential operative in the other zones.

It is furthermore possible to assembly the additional electrode 10 from several shell-type parts of which each can be swung about a vertical axis and which, in one extreme position, form a substantially closed cylindrical electrode surface and, in their other extreme position, are disposed radially outwards so that the electrode surface then consists of only a cage formed by the vertical axes of rotation. By means of such an electrode 10 the potential operative on the surface of the shielded portion of the workpiece may also be influenced.

What is claimed is:

1. The method of selectively ionitriding a workpiece in a metallic vacuum container containing a nitrogeneous atmosphere, said workpiece and said container being operated as a cathode and an anode, respectively, to produce a glow discharge established by an electrical potential between them caused by a current source, including the steps of:

placing a metallic electrode at a distance from said workpiece and intermediate said workpiece and said container in juxtaposition to a selected area of said workpiece so that the workpiece and said electrode can be operated as a cathode and an anode, respectively and establishing an electrical potential between said intermediate electrode and said workpiece of less value than the said potential establishing the said glow discharge between said container and said workpiece, thereby bombarding the said selected area, at least temporarily, by ions of less energy than the ions bombarding the unselected area of said workpiece.

2. The method of ionitriding a worm for screw extruders to effect different nitrogen contents in selected portions of said worm comprising the steps of:

providing a worm made from nitriding steel;

connecting the worm as the cathod in a metallic glow discharge chamber having a low pressure nitrogenous atmosphere therein;

placing a metal cylindrical electrode surrounding the drive end filling portion of said worm at a distance from said worm and intermediate said worm and the wall of said chamber and electrically insulating the same therefrom; and producing a glow discharge within said chamber by establishing an electrical potential of a given value between said chamber and said worm and a lower electrical potential between said intermediate cylindrical electrode drive end portion surrounded thereby and said worm.

References Cited

UNITED STATES PATENTS

| 2,946,708 | 7/1960 | Berghaus et al. | 148—16.6 |
| 3,190,772 | 6/1965 | Berghous et al. | 148—16.6 X |
| 3,341,352 | 9/1967 | Ehlers | 204—164 X |
| 3,536,602 | 10/1970 | Jones et al. | 204—164 |
| 3,650,930 | 3/1972 | Jones et al. | 204—177 |

CHARLES N. LOVELL, Primary Examiner

U.S. Cl. X.R.

148—16.6; 204—177